(No Model.)
M. O. PARENTEAU.
ANTIFRICTION BEARING.
No. 488,697. Patented Dec. 27, 1892.
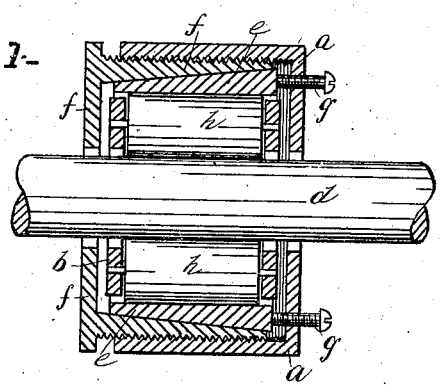
Fig-1-
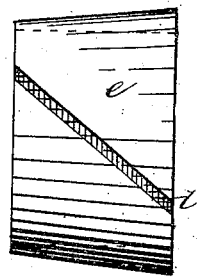
Fig 3-
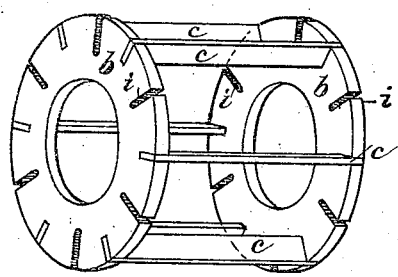
Fig-2-
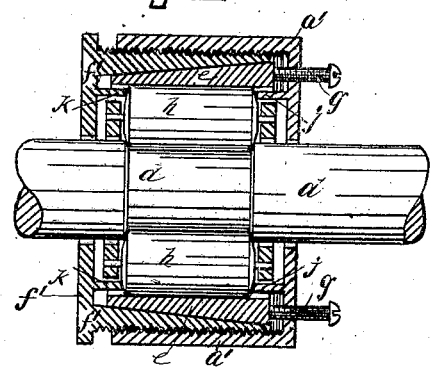
Fig-4-
Witnesses
Robt Ruddell
J. H. Bartlett.
Inventor
Maxime O. Parenteau
By Allen Webster
Attorney

UNITED STATES PATENT OFFICE.

MAXIME O. PARENTEAU, OF SPRINGFIELD, MASSACHUSETTS.

ANTIFRICTION-BEARING.

SPECIFICATION forming part of Letters Patent No. 488,697, dated December 27, 1892.

Application filed October 14, 1891. Serial No. 408,734. (No model.)

*To all whom it may concern:*

Be it known that I, MAXIME O. PARENTEAU, a citizen of the United States of America, residing in Springfield, in the county of Camden, in the State of Massachusetts, have invented a new and useful Improvement in Antifriction-Bearings, of which the following is a specification.

In the accompanying drawings:—Figure 1 is a side elevation of the central section illustrating the construction and aggroupment of the respective parts. Fig. 2 is a perspective of the cage. Fig. 3 is a side view of the adjustable casing. Fig. 4 is a view in section illustrating a modification wherein the shaft is formed with an annular depression to receive the bearing faces of the roller.

Referring to the drawings letter $d$ represents the shaft. On this shaft is mounted a cage composed of end pieces $b$ provided with apertures to receive the shaft, the end pieces being connected by cross bars $c$ laid in radial slots, substantially as shown in Fig. 2 of the drawings. Intermediate with the cross bars $c$ are formed radial slots $i$ in which are disposed small journals projected from the ends of the anti-friction rollers $h$. This cage is mounted or arranged upon a shaft $d$ and the rollers are arranged thereon with journals disposed in the open-end radial slots $i$ substantially as shown in the drawings. Arranged over the cage is a cylindrical casing $e$ tapering lengthwise upon its exterior surface substantially as shown in Fig. 3 of the drawings, and is slitted diagonally, as shown at $l$ in order that it may be contracted to take up the wear of the rollers. This casing $e$ is arranged over the cage and rollers substantially as shown in Figs. 1 and 4.

The letter $f$ designates a cup-shaped casing having a threaded exterior surface as shown in the drawings, and a flaring interior surface to fit over the tapering exterior of the casing $e$ as shown in Fig. 4. This casing $f$ fits snugly and firmly upon the casing $e$ in order that in the adjustments to be made, the casing $e$ may be contracted to take up the exigencies of the rollers which may arise by the continued operation of the device.

Letter $a$ designates the exterior casing wherein are contained all other elements as indicated in the drawings, this consists of an open-end shell having interior threads to engage the casing $f$, and is provided with adjusting screws $g$ let through the end face and engaging against the edge of the interior split casing $e$ as shown in Fig. 1 of the drawings.

To prevent the endwise movement of the rollers on the shaft, the shaft may be formed with an annular recess as shown in Fig. 4, wherein the rollers turn. The shoulders of these recesses are preferably made slightly tapering and the ends of the rollers are tapered to conform to the shape of the walls of the annular recess.

In Fig. 4 the casing $a'$ is formed with an interior annular flange $j$ projecting from its inner end face to contact with the outer or upper edges of the respective rollers; and the casing $f'$ is formed with a similar flange $k$ to serve the same purpose at the opposite end of the roller. Through the casing $a'$ are projected a requisite number of adjusting screws $g$ bearing with their ends against the end face of the casing $e$, whereby turning these adjusting screws the casing $e$, may be forced into the casing $f'$ and the casing $e$ thus contracted and the rollers held in connection of operative position within the cage, and in contact with the shaft thus compensating for, or taking up any wear that may have been occasioned by the use of the device.

Having thus described my invention, what I claim and desire to secure by Letters Patent is

1. The combination of the shaft, a cage arranged thereon, having end pieces connected by cross bars $c$, and intermediate bearings between the cross bars in the end pieces, antifriction rollers mounted in the bearings of the cage, a casing $e$ diagonally split and having a tapering exterior surface arranged over the cage and rollers, a casing having threaded exterior surface and a flaring interior to set over the tapering exterior of the casing $e$, and an exterior casing having interior threads to engage the exterior threads of the casing and engaging the end of the split casing $e$, whereby the wear of the rollers may be compensated or taken up, substantially as described.

2. A roller bearing composed of the shaft $d$ formed with an annular recess, as shown, a cage mounted on the shaft, composed of end pieces $b$ connected by cross pieces $c$ and formed with slotted bearings, anti-friction rollers disposed in the said bearings of the cage, the split cylindrical ring $e$ having a tapering outer surface a casing $f'$ having a threaded exterior, and an interior flaring surface to set over the tapering surface of the split casing $e$ and formed with an interior annular flange $k$ to set against the end of the anti friction rollers; and the outer casing $a'$ formed with interior threads to engage the casing $f'$, and a projecting interior annular flange to set against the ends of the anti friction rollers; substantially as and for the purpose specified.

MAXIME O. PARENTEAU.

Witnesses:
M. J. PARENTEAU,
ALLEN WEBSTER.